3,076,781
BLENDS OF VINYLIDENE CHLORIDE/ACRYLO-NITRILE COPOLYMERS AND CHLORINATED POLYOLEFINS
Hans Helmut Frey, Frankfurt am Main, Germany, assignor to Farbwerke Hoechst Aktiengesellschaft vormals Meister Lucius & Brüning, Frankfurt am Main, Germany, a corporation of Germany
No Drawing. Filed Jan. 28, 1959, Ser. No. 789,513
Claims priority, application Germany Feb. 4, 1958
6 Claims. (Cl. 260—45.5)

The present invention relates to improved polymers containing vinylidene chloride.

Polyvinylidene chloride and its copolymers are of great importance in the field of paints, lacquers and varnishes and artificial materials. Foils prepared from polyvinylidene chloride or its copolymers have the particularly valuable property of being to a high degree impermeable to water vapour. This property facilitated the introduction of polyvinylidene chloride and its copolymers into the packaging field.

Polyvinylidene chloride and its copolymers have, however, the considerable disadvantage of being brittle. To remove this drawback it is in most cases necessary to add plasticizers of low molecular weight when working up polyvinylidene chloride and its copolymers. The addition of these plasticizers in its turn gives rise to other properties which are disagreeable in practice, for example migration, volatility and extractability of the plasticizer.

Now I have found that polyvinylidene chloride and its copolymers can be improved by adding at least one chlorinated or sulfochlorinated macromolecular hydrocarbon.

By macromolecular hydrocarbons to be used according to the invention there are to be understood the homo- and copolymers of ethylene, propylene and the higher homologs thereof which have been prepared by the known high pressure polymerization process or, preferably, by the known low pressure polymerization process (cf., for example, Raff and Allison, "Polyethylene," 1956, page 72 et seq.). As low pressure polyolefins there should above all be mentioned those that have been prepared by the process described in Belgian Patents 533,362; 534,792; 534,888 and 540,459. These polyolefins are distinguished by special properties. For example, polyethylene prepared by the process described in the aforesaid Belgian patents in the presence of a catalyst system comprising an organo-metal compound and a compound of an element of subgroups IV to VI of the periodic table has a molecular weight of more than 50,000, a melting point above 130°., a density of 0.94 and more than 0.94 ("high density polyethylene"), a degree of crystallinity of about 80% and a structure which is to a high degree straight-chained and unbranched. Besides polyethylene there may, for example, be used for improving polymers of vinylidene chloride according to the invention polypropylene, polybutylenes, copolymers of different olefins and mixtures of different polyolefins after their chlorination or sulfochlorination.

In order to produce the desired effect by the above-described addition it is, however, necessary that the hydrocarbon chain be homogeneously or substantially homogeneously chlorinated; this means that each individual polymer molecule must possess chlorine atoms in its chain. It is, however, not absolutely necessary that each molecule shall have the same chlorine content. Such a homogeneous chlorination is attained, for example, by chlorinating an olefin polymer in the dissolved state, for instance in a solvent, for example a halogenated hydrocarbon such as carbon tetrachloride, chloroform or tetrachloroethane. However, substantially homogeneous and accordingly effective chlorinated products suitable as additions may also be obtained by other processes, for example by the process described in U.S. Patent application Serial Number 643,499, filed on March 4, 1957, in the name of Helmut Klug et al. for "Manufacture of Chlorinated Polyethylene," or by the process described in U.S. Patent application Serial Number 761,454, filed on September 17, 1958, in the name of Helmut Klug et al. for "Manufacture of Chlorinated Polyethylene."

In the polychloroprene chain, a substantially homogeneous distribution of the chlorine in the hydrocarbon chain is ensured by its process of preparation, i.e. by the polymerization. Polychloroprene is therefore also suitable as additive to be used according to the invention. The products obtained by chlorination of the fraction of copolymers of ethylene and propylene which is insoluble in aliphatic hydrocarbons having a boiling range of 80° to 22° C. have proved particularly suitable for the improvement of polymers containing vinylidene chloride.

In the preparation of copolymers of ethylene and propylene, a fraction of products is obtained which is substantially crystalline and which is insoluble in aliphatic hydrocarbons boiling at a temperature of about 80° to 220° C., which hydrocarbons are used in most cases as reaction medium, whereas another, essentially amorphous fraction of the products is soluble in said hydrocarbons. The insoluble fraction is subjected to chlorination and subsequently utilized in accordance with the process of the present invention. The effect of this product is the more surprising since, owing to its high crystallinity, the fraction of the copolymer of ethylene and propylene which is insoluble in aliphatic hydrocarbons would appear less suitable as starting material for the preparation of plasticizers for polyvinylidene chloride than the rubber-like fraction which is soluble in aliphatic hydrocarbons.

The chlorinated polyolefins are admixed with the polyvinylidene chloride or its copolymers in a quantity of between about 10 and about 70% by weight, and preferably of between 20 and 50% by weight, calculated upon the mixture, the chlorine content of the chlorinated polyolefins advantageously ranging from about 20 to about 60% by weight, and preferably from 30 to 50% by weight. The admixture of these chlorinated high polymers with polyvinylidene chloride yields a product having absolutely new properties.

Mixtures of the above-mentioned chlorination products of polyolefins with a polymer or copolymer of 2-chlorobutadiene (chloroprene) may also be used.

Sulfochlorination products of the above-mentioned polyolefins are obtained by reacting said polyolefins with chlorine and sulfur dioxide according to a known process, for example the process described in U.S. Patent 2,212,786. A special advantage of these sulfochlorination products resides in the fact that corresponding to the content of sulfochloride groups the mixture of polyvinylidene chloride and sulfochlorination products may subsequently by vulcanized by known methods, for example by the process described in U.S. Patent 2,723,257.

The content of chlorine in the sulfochlorination products may vary within wide limits. Even in the case of a low chlorine proportion of about 5%, favorable effects, for example on the notched-bar impact strength, can already be observed. The content of sulfur in the sulfochlorination products may also vary within wide limits; generally, however, it should not exceed 10%. The sulfochlorination products are admixed with the polymers of vinylidene chloride in the same proportion as the chlorination products, viz. in a proportion of 10 to 70% by weight, and preferably 20 to 50% by weight. Mixtures of different additives are added in the same proportion.

As additives for use according to the present invention there may be employed with special advantage sulfochlorination products of that fraction of a copolymer of ethylene and propylene, preferably prepared by a low-pressure polymerization process, which is insoluble in aliphatic hydrocarbons boiling between about 80° and 220° C.

The sulfochlorination products according to the invention may also be used in admixture with the above-mentioned chlorination products, in particular with the chlorination products of the fraction of a copolymer of ethylene and propylene, preferably prepared by a low-pressure polymerization process, which is insoluble in aliphatic hydrocarbons boiling between about 80° and 220° C. There may also be used mixtures of sulfochlorination products of highly polymeric hydrocarbons with other chlorine-containing polymers, especially polymers and copolymers of 2-chlorobutadiene, optionally in combination with the chlorination products of polyolefins, particularly of a copolymer of ethylene and propylene, mentioned above.

By polyvinylidene chloride and its copolymers there are here to be understood polymers obtained from 50 to 100%, preferably 70 to 80%, of vinylidene chloride and 0 to 50%, preferably 20 to 30%, of another monomer suitable for use in the copolymerization with vinylidene chloride. As monomers suitable for use in the copolymerization with vinylidene chloride there may be mentioned by way of example vinyl chloride, acrylonitrile, acrylic acid esters, and mixtures thereof.

It was not to be foreseen that the chlorination products of high molecular weight added to the homo- or copolymers of vinylidene chloride according to the invention would improve the properties of, for example, polyvinylidene chloride, since the added chlorination products, especially those having an average content of chlorine of, for example, 20 to 40%, are sticky masses which alone have neither sufficient solidity nor dimensional stability when being heated.

It should especially be noted that an addition of a relatively large amount of chlorination products has practically no effect to impair the good properties of polyvinylidene chloride and its copolymers, for example resistance to chemicals, mechanical strength, thermostability but improves considerably the notched-bar impact strength and impact strength of the polymer mixtures according to the invention and also the low temperature properties of polyvinylidene chloride and its copolymers. In this connection it should be mentioned that the notched-bar impact strength, impact strength and low temperature properties of polyvinylidene chloride may also be improvide by adding a known plasticizer. But in this case most of the other properties are impaired so that the known processes involve important disadvantages. It should furthermore be pointed out that in general it is desirable to increase the value of the notched-bar impact strength, impact strength and low temperature properties of plastics as low values indicate brittleness.

Polyvinylidene chloride and its copolymers may be mixed with the additives to be used according to the invention by a known method, for example by mixing on a roller or an extruder or by mixing the solutions of the individual components and subsequently expelling the solvent.

If desired, known stabilizers, plasticizers, filling agents, dyes and pigments may be admixed with the mixtures in order to obtain special effects.

The products obtained by the process of the invention can be worked up by molding to yield foils, sheets or structures of other shapes. By the transfer molding and injection molding processes structures of any desired shape can be obtained. By extrusion molding, tubes, bands, rods and profiles are obtained which may be worked up in known manner, for example to bottles.

Owing to their good electric properties the products obtained by the process of the invention can also be used for various applications in the electrical field, for example for wire coating or in the production of coil formers.

The preparation of foamy plastics is also possible.

The products obtained by the process of the invention may also be applied in the field of varnishes and lacquers, the components being dissolved or suspended in an appropriate solvent, if desired while adding other mixing components in order to obtain special effects; the solution or suspension is then applied by a known method to a base material.

The following examples serve to illustrate the invention but they are not intended to limit it thereto.

*Example 1*

A copolymer of vinylidene chloride with acrylonitrile (85:15) was rolled for 10 minutes at 160° C. on a mixing roller and subsequently the same copolymer was rolled for 10 minutes at 160° C. on a mixing roller while in one case 10% and in another case 20%—calculated on the total mixture—of chlorinated low pressure polyethylene containing 40% of chlorine was added. The rolled sheets were compressed to form plates of 4 mm. thick which were found to have the following characteristic values:

| | Notched-bar impact strength at 20° C. (cm. kg./cm.$^2$) |
|---|---|
| Copolymer of vinylidene without any addition | 4 |
| The same copolymer with 10% of chlorinated low pressure polyethylene (content of chlorine 40%) | 20 |
| The same copolymer with 20% of chlorinated low pressure polyethylene | 22 |

*Example 2*

The mixtures of copolymers of vinylidene chloride and chlorinated or sulfochlorinated polyolefins and polychloroprene indicated in the following table were thoroughly plasticized for 15 minutes at a temperature of 150° C. on a mixing roller while 2% of di-butyl-tin-di-thioglycolic acid-2-ethyl-hexyl ester and 1% of a lubricant based on montan wax were added. Rolling was continued until the constituents were homogeneously mixed. The rolled sheets were compressed for 10 minutes at a temperature of 160° C. and under a pressure of 100 kg./cm.$^2$ to form plates of 4 mm. thickness. By means of standard test bars prepared from the aforesaid plates the following values of notched-bar impact strength at 20° C. and 0° C. were ascertained (cf. the following table).

Table

| | Component of the copolymer | | Amount contained in the total mixture of— | | Type and process of preparation of the polyethylene subjected to chlorination | Method of chlorination or sulfochlorination | Content of chlorine of the chlorinated polyethylene, percent | η-red. of the chlorinated polyethylene determined in a solution of 0.5% strength in tetrahydronaphthalene at 135° C. | Further additives | Notched-bar impact strength at— | |
|---|---|---|---|---|---|---|---|---|---|---|---|
| | Content of vinylidene chloride, percent | Content of vinyl chloride or acrylonitrile | Copolymer of vinylidene chloride, percent | Chlorinated polyethylene, percent | | | | | | 20° C., cm. kg./cm.² | 0° C., cm. kg./cm.² |
| 1 | 90 | 10% of vinyl chloride. | 80 | 10 | Low pressure polyethylene (Ziegler). | Chlorinated in water at 120° C. | 37 | 2.3 | 10% of polychloroprene. | 22.5 | 3.6 |
| 2 | 90 | ⸺do⸺ | 70 | 30 | Low pressure polyethylene (Philipps). | Chlorinated in water at 115° C. | 38.5 | 0.9 | | 12.3 | 1.5 |
| 3 | 90 | ⸺do⸺ | 50 | 50 | Low pressure polyethylene (Ziegler). | Chlorinated in water at 120° C. | 37 | 2.3 | | (¹) | 28.3 |
| 4 | 90 | ⸺do⸺ | 50 | 50 | High pressure polyethylene (ICI). | Sulfochlorinated in carbon tetrachloride at about 70° C. | ² 27 | | | (¹) | (¹) |
| 5 | 80 | 20% of acrylonitrile. | 50 | 50 | ⸺do⸺ | ⸺do⸺ | ² 27 | | | (¹) | (¹) |
| 6 | 80 | ⸺do⸺ | 50 | 50 | Low pressure polyethylene (Ziegler). | Chlorinated in water at 120° C. | 37 | 2.3 | | (¹) | 52.8 |
| 7 | 80 | ⸺do⸺ | 60 | 40 | Low pressure copolymer of ethylene and propylene 90:10 (Ziegler), a fraction insoluble in hydrocarbons. | Chlorinated in water at 115° C. | 38 | 1.4 | | (¹) | 23.8 |

¹ No break.  ² And 1.5% of S.

I claim:

1. A composition of matter comprising (1) 30 to 90 percent by weight of a copolymer of vinylidene chloride and acrylonitrile containing at least 50 percent by weight vinylidene chloride and (2) 70 to 10 percent by weight of a substantially homogeneously chlorinated macromolecular polymer of a compound selected from the group consisting solely of ethylene, propylene, butylene and mixtures thereof, said composition having a notched-bar impact strength superior to that of copolymer (1).

2. The composition of claim 1 wherein compound (1) is a copolymer of 70 to 80 percent by weight of vinylidene chloride and 30 to 20 percent by weight of acrylonitrile.

3. The composition of claim 1 wherein compound (2) is chlorinated polyethylene.

4. The composition of claim 1 wherein compound (2) has a chlorine content of 20 to 60 percent by weight.

5. The composition of claim 1 wherein a portion of compound (2) is replaced by polychloroprene.

6. The composition of claim 1 wherein compound (2) is a product prepared by chlorination of a fraction of a copolymer of ethylene and propylene which is insoluble in a mixture of olefinic hydrocarbons boiling between 80° C. and 220° C.

References Cited in the file of this patent

UNITED STATES PATENTS

| | | |
|---|---|---|
| 2,592,763 | Taylor | Apr. 15, 1952 |
| 2,630,398 | Brooks et al. | Mar. 3, 1953 |
| 2,693,459 | Fisk | Nov. 2, 1954 |
| 2,695,899 | Becker et al. | Nov. 30, 1954 |
| 2,956,980 | Law | Oct. 18, 1960 |
| 3,006,889 | Frey | Oct. 31, 1961 |
| 3,022,263 | Orthner et al. | Feb. 20, 1962 |